Sept. 4, 1928.

J. ROBINSON 1,682,854

AUTOMATIC TRAIN PIPE COUPLING

Original Filed Nov. 29, 1920    2 Sheets-Sheet 1

INVENTOR
Joseph Robinson
BY
Watson, Coit, Morse & Grindle
ATTORNEY

Sept. 4, 1928.  J. ROBINSON  1,682,854
AUTOMATIC TRAIN PIPE COUPLING
Original Filed Nov. 29. 1920  2 Sheets-Sheet 2

INVENTOR
Joseph Robinson
BY
Watson, Coit, Morse & Grindle
ATTORNEY

Patented Sept. 4, 1928.

1,682,854

UNITED STATES PATENT OFFICE.

JOSEPH ROBINSON, OF NEW YORK, N. Y.

AUTOMATIC TRAIN-PIPE COUPLING.

Application filed November 29, 1920, Serial No. 427,047. Renewed January 28, 1928.

My invention relates to improvements in automatic train pipe couplings and has among its objects to provide an improved support for such couplings in which a novel form of ball and socket universal joint is employed to permit universal movement to the coupling head. A further object is to provide means whereby buffer springs of different lengths may be used in that type of support for automatic train pipe couplings in which the buffer spring is located in front of the bracket.

With these and other objects in view, my invention consists in the combination, arrangements, and constructions hereinafter described, pointed out in the appended claims, and illustrated in the accompanying drawings in which:

Figure 1:
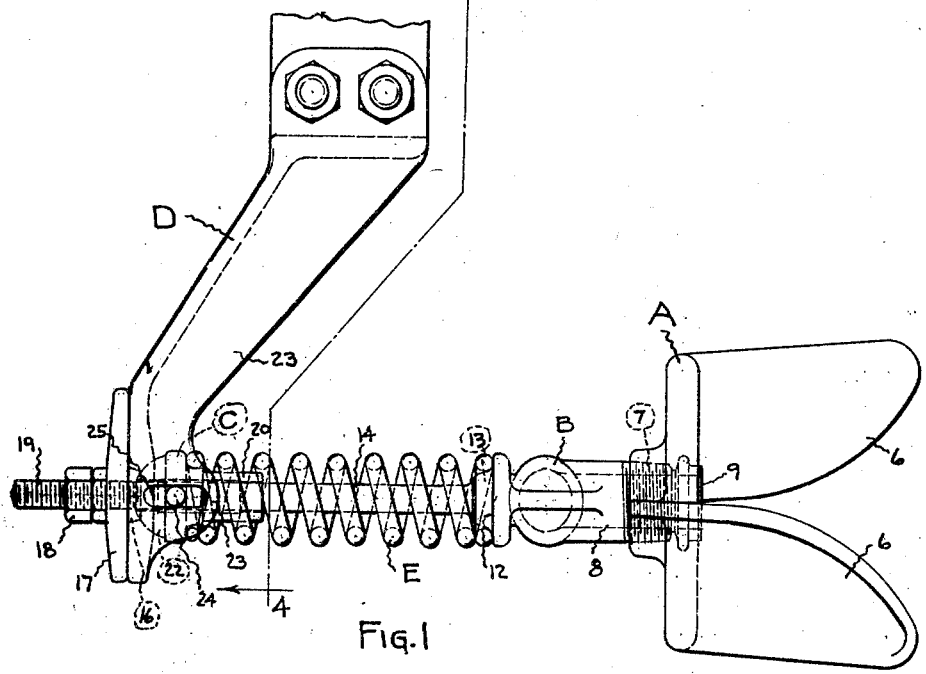
Figure 1 is a side elevation of my improvement.

Referring now to the drawings: Any desired type of coupling head A may be carried by my improved support. I show a head having suitable guiding means 6 and a centrally located opening or port 7 threaded to receive the conduit 8, as appears particularly in Figure 1. The head is provided with any suitable gasket 9 carried preferably in the plane of the coupling face of the head.

Figure 2:
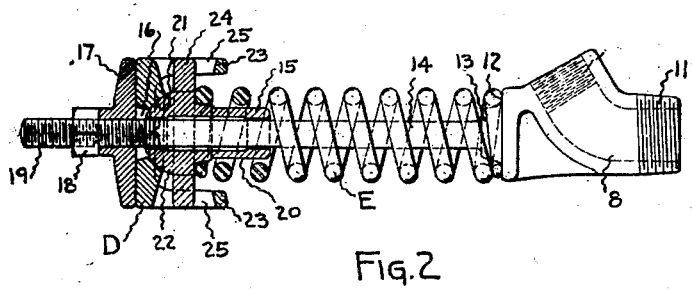
Figure 2 is a sectional plan view showing in section my improved universal joint. In this view the coupling head A is omitted.
Figure 3:
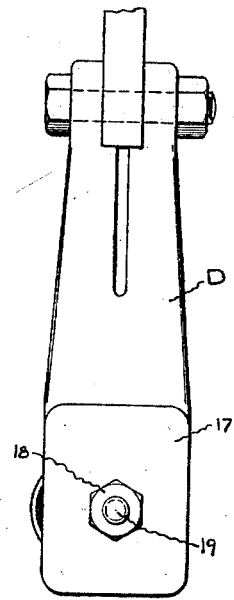
Figure 3 is a rear elevation of my improved support with the coupling head omitted.

My improved support comprises a pipe or body B having at its forward end a laterally diverging hollow conduit 8 internally threaded as at 10 to suitably receive the ordinary train pipe hose, and externally threaded, as at 11 Figure 2, to receive the coupling head A as aforesaid. Upon the rear face of the conduit 8 I provide an annular shoulder or bearing 12 and an annular boss 13, and projecting rearwardly from these I provide a stem 14 formed integral with the shoulder 13 and the bearing 12, though it may, of course, be formed separately therefrom if desired. The stem is preferably rectangular in cross-section and loosely extends through a correspondingly shaped opening 15 in the ball member or seat C of my improvement, and through a flared opening 16 in the bracket D and for a considerable distance to the rear of the racket. From a point within the opening 15, the rear end of the stem is round, as shown particularly in Figures 2 and 3, and threadingly receives a suitable abutment or device 17 which normally engages the rear face of the bracket D to limit movement of the coupling head A forward of the bracket, and which cooperates with the buffer spring E to yieldingly support the head. A suitable lock nut or device 18 is screwed onto the stem 14, and behind the abutment or flange 17, to lock the flange in place, while the portion 19 of the stem 14, in co-operation with the hollow shank 20 of the member C, permits of adjustment of the shoulder 12 and boss 13, and hence the coupling head A, toward or away from the bracket to permit of the use of buffer springs E of different lengths. This is an important feature of my improvement. In supports heretofore offered of the type in which the buffer spring is located in front of the bracket it is not possible to change from a short to a longer spring for the purpose of obtaining greater compression, or greater resistance, to meet changing standards of train pipe pressure carried by the various railroads for the operation of the brakes and the heating of the cars. Experience has shown it to be highly desirable to so construct the support as to readily permit of this change.

The universal joint of my improvement comprises a curved seat or bearing 21 formed on the lower end of the bracket D and preferably on the vertical center line thereof and concentric with the opening 16. The ball member or seat C is provided on its rear side with a semi-spherical face 22 fitting the curved bearing 21 and mounted thereon for universal movement relative to the bracket. The lower end of the bracket is provided with a pair of vertically disposed forwardly extending projections 23 preferably formed integral with the bracket and lying on opposite sides of the bearing 21, as shown particularly in Figures 1 and 2. To prevent undue rotation of the seat C about its longitudinal axis, I provide it with diametrically opposite projections or trunnions 24 preferably formed integral with the seat, on its pivotal center, and lying in the horizontal plane as shown. These projections extend into elongated slots or bearings 25 of the projections 23, and have rotary and oscillatory movement therein. As the trunnions 24 slide along the upper and lower walls of these slots or bearings 25, when the coupling head A moves laterally of the bracket, they may be said to also have sliding engagement with the bearings 25.

Upon the front face of the member or seat C I provide an annular bearing 26 for the buffer spring E, extending forward from this bearing I provide the seat with the aforesaid shank 20. Surrounding this shank, and mounted upon the bearing 26 and the annular bearing or shoulder 12, I provide the aforesaid buffer spring E, which serves to yieldingly sustain and extend the coupling head A and maintain the projection or device 17 normally pressed against the rear side of the bracket D. The necessary initial compression of the spring to enable it to thus support the coupling head A is obtained by adjusting the abutment or flange 17 forward on the stem 14, which operation varies the compression of the spring and hence the resistance with which it draws the flange 17 against the rear face of the bracket D and resists lateral movement of the coupling head A.

Figure 4:
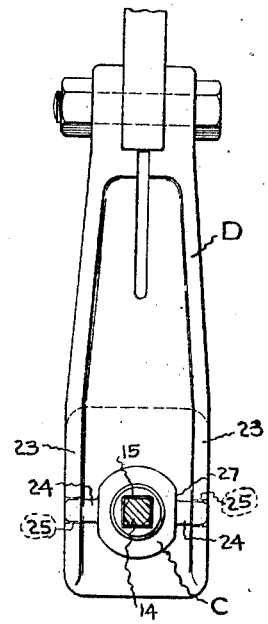
Figure 4 is a front view of my improved support taken on the line 4—4 of Figure 1, with spring omitted
Figure 5:
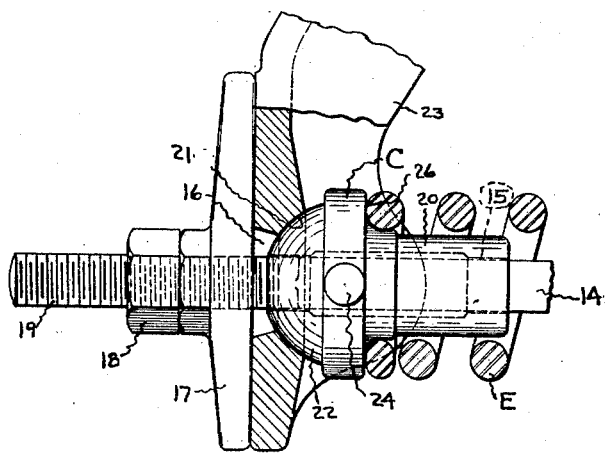
Figure 5 is an enlarged detail view of my improved universal joint showing some of the parts in section.

The foregoing construction produces an improved train pipe coupling support of the type having the buffer spring in front of the bracket in which buffer springs of different lengths may be used, and in which the minimum resistance is offered to lateral movement of the coupling head A. The arrangement produces a simple and rugged construction in which the seat C supports the rear end of the buffer spring E and permits universal movement of the spring and the coupling head A relative to the bracket but not rotary movement thereof about the longitudinal axis of the spring or seat C. The projections or trunnions 24 co-operate with the bearings 25 to prevent such rotation of the seat, while the rectangularly shaped shank or stem 14 of the member B prevents rotation of the coupling head A and the conduit 8 relative to the seat or member C, though the stem 14 may, of course, slide freely in the complementary opening 15 of the shank 20 to permit rearward movement of the coupling head when opposing heads couple up in service. The shank 20 is of sufficient length to insure a firm interlock between it and the stem 14 and to give to the coupling head A, when it moves laterally of the bracket D, an effective leverage over the frictional resistance to such movement occurring between the seat C and the bearing 21, while the distance which the cylindrical portion 19 of the stem 14 lies behind the forward end of the shank is such as to insure that the rectangularly shaped portion of the stem will extend a considerable distance into the opening 15 when a buffer spring E of the maximum length is used. The member or seat C is assembled on its bearing 21 by passing one of the trunnions 24 into the recess or bearing 25, formed in the projections 23 of the bracket D, and shifting the member C laterally until its cutaway portion 27, Figure 4, engages the inner wall of the projections 23, whereupon the other trunnion 24 may be brought into alignment with its bearing 25 and the member C shifted into position with its spherical shaped face 22 fitting the bearing 21.

What I claim is:

1. In an automatic train pipe coupling, the combination of a coupling head, a bracket having a perforation in its lower end, a pair of projections extending forward from the bracket on opposite sides of said perforation, an elongated bearing on each of said projections, a seat mounted on the front face of said bracket for universal movement thereon and having a perforation aligning with the perforation in said lower end of the bracket, a member extending rearward from said coupling head through said perforations and serving to prevent excessive rotation of the coupling head relative to said seat, a device mounted on the rear of said member and engaging said bracket to limit movement of said coupling head forward of the bracket, a spring surrounding said member and supported on said seat, means to adjust said device along said member to vary the compression of said spring, and projections extending laterally of said seat from opposite sides thereof into engagement with said bearings for oscillatory and sliding movement thereon.

2. In an automatic train pipe coupling, the combination with a coupling head, a bracket having a perforated lower end, a pair of projections extending forward from the bracket on opposite sides of said perforation and provided each with an elongated opening or recess, a ball-shaped seat mounted on the front face of said bracket for universal movement thereon and provided with a hollow shank in alignment with said perforation, a member extending rearward from said coupling head through said shank and said perforation and shaped to prevent excessive rotation of the coupling head relative to said seat, said member being supported by said shank and having sliding movement therein, a device mounted on the rear end of said member and engaging said bracket to limit movement of said coupling head forward of the bracket, a spring surrounding said member and said shank and supported on said seat, means to adjust said device along said member to vary the compression of said spring, and a pair of diametrically opposite projections located on the pivotal center of said seat and extending laterally from the sides of the said seat into said elongated opening or recess.

3. In an automatic train pipe coupling, the combination with a coupling head of a bracket having an opening at its lower end, a ball-shaped seat mounted on the front face of said bracket for universal movement thereon, a stem secured to said head and extending rearwardly through said seat and said bracket, said stem having an abutment thereon adapted to engage the rear face of the bracket, cooperating means on said seat and said stem for preventing relative rotation between the same, said bracket having an elongated opening or recess on each side of said first named opening, a pair of diametrically opposite projections rigidly secured to said seat and located on the pivotal center of the same and extending laterally therefrom into said elongated openings in the bracket, and a spring surrounding said stem and bearing against said seat for holding said abutment against the rear face of the bracket.

4. In an automatic train pipe coupling, the combination of a coupling head, of a bracket having a perforation in its lower end, said bracket also having an elongated opening or recess on each side of said perforation, a seat mounted on and engaging the front face of said bracket between said elongated openings, said seat having laterally extending trunions which extend into said elongated openings in the bracket, a stem secured to said head and extending rearwardly through said seat and through said perforation in the bracket, said stem having an abutment adapted to contact with the rear face of the bracket, and a coil spring surrounding said stem between said head and said seat and arranged to exert pressure against the latter for forcing said abutment against the rear face of the bracket.

In testimony whereof I hereby affix my signature.

JOSEPH ROBINSON.